Sept. 25, 1956   J. R. HOLLINS   2,764,752
LIGHTING CIRCUIT CONDITION INDICATOR
Filed July 19, 1954
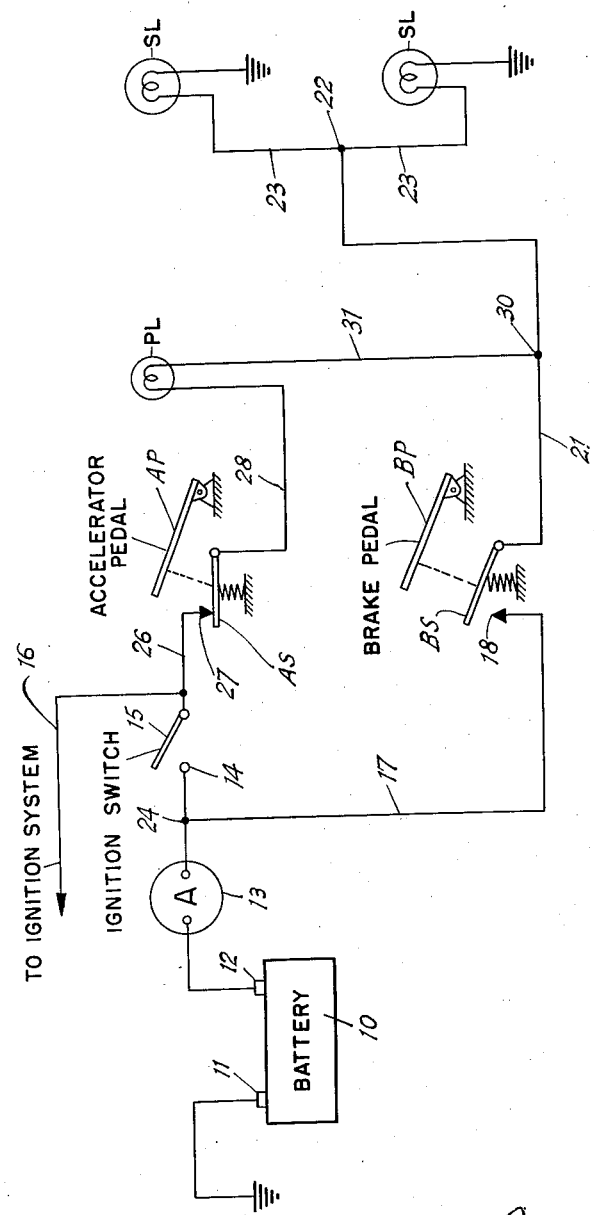
INVENTOR
Jesse R Hollins
BY
ATTORNEY

United States Patent Office 2,764,752
Patented Sept. 25, 1956

2,764,752

LIGHTING CIRCUIT CONDITION INDICATOR

Jesse R. Hollins, Brooklyn, N. Y.

Application July 19, 1954, Serial No. 444,309

3 Claims. (Cl. 340—252)

This invention relates to indicators for electric lighting circuits and, more particularly, to a novel indicator lamp arrangement for indicating the condition of a vehicle stop lamp circuit responsive to a condition of the vehicle controls presaging an application of the vehicle brakes.

In my U. S. Patent No. 2,486,599, issued November 1, 1949, for "Lighting Circuit Condition Indicator," I have shown a high resistance, low candlepower pilot or indicator lamp in shunt with the brake pedal operated switch controlling operation of the stop lamps. The pilot lamp is connected to the vehicle source of energy through the ignition switch. Thus, whenever the ignition switch is closed, the pilot lamp is lit except when the brakes are applied. Should the pilot lamp remain unlit when the brake pedal is released, or remain lit when the brakes are applied, a defective condition of the stop lamp circuit is indicated.

With this arrangement, the pilot lamp is continuously lit whenever the ignition is "on," except when the brakes are applied or in the event of a defective stop lamp circuit. A substantially continuously lit pilot lamp on the instrument panel is objectionable to many drivers, particularly under night driving conditions. This objection is more pronounced with the later model cars involving an increase in the number of lighted dials and lamps on the instrument panel. Additionally, a substantially continuous current drain is imposed on the battery by the pilot lamp.

Accordingly, the present invention is directed to an improved stop lamp circuit indicator arrangement in which a circuit condition indicating or pilot lamp is illuminated only responsive to such operation of the vehicle controls as would normally precede the initiation of movement from rest of a vehicle, or presage or precede an application of the vehicle brakes of a vehicle in motion.

More specifically, an accelerator pedal operated switch is connected in series with a high resistance, low candlepower, pilot lamp connected in series with the low resistance, high candlepower, grounded vehicle stop lamps. The pilot lamp and accelerator pedal operated switch are connected in shunt with the brake pedal operated switch and in series with the ignition switch. The accelerator pedal operated switch is closed only when the accelerator pedal is substantially fully released, and opened when the accelerator pedal is depressed.

Consequently, with the ignition "on," the brakes released, and the accelerator pedal depressed, during the initiation or maintenance of vehicle movement, the pilot lamp is extinguished. When the accelerator pedal is in released position, as just prior to the initiation of movement of the vehicle, or as just prior to a brake application of a vehicle in motion, the pilot lamp is lit, but its high resistance prevents effective illumination of the stop lamps. When the brakes are applied, with the accelerator pedal released, the pilot lamp is extinguished, by shunting, and the stop lamps are illuminated.

The foregoing applies only if the stop lamp circuit is operative. Should it be inoperative, the pilot lamp will not light when the driver "lets up on the gas," and may be lit when the brakes are applied.

For an understanding of the invention, reference is made to the following detailed description of typical embodiments thereof as illustrated in the accompanying drawing. In the drawing, the single figure is a schematic wiring diagram of a stop lamp circuit condition indicating arrangement embodying the invention.

Referring to the drawing, a vehicle stop lamp arrangement is illustrated as including low resistance, high candlepower, grounded stop lamps SL controlled by a normally open brake pedal operated switch BS closed whenever brake pedal BP is depressed to apply the vehicle brakes. The vehicle is schematically illustrated as including a source of electrical energy such as the usual battery 10 having one terminal 11 grounded and its other terminal 12 connected to one side of ammeter 13. The other side of ammeter 13 is connected to the "live" or "hot" terminal 14 of ignition switch 15. A conductor 16 connects the other terminal of ignition switch 15 to the ignition system. A conductor 17 connects ammeter 13 to the front contact 18 of switch BS. The armature of switch BS is connected by a conductor 21 to a junction point 22 from which parallel branch conductors 23 lead to the ungrounded terminals of stop lamps SL.

In accordance with the present invention, a conductor 26 connects the armature 15 of the ignition switch to the front contact 27 of an accelerator pedal operated switch AS. Switch AS is opened whenever accelerator pedal AP is depressed to "feed gas" to the engine. Whenever pedal AP is fully or substantially fully released, switch AS is closed. The armature of switch AS is connected, by a conductor 28, to one side of a high resistance, low candlepower, pilot or indicator lamp PL preferably mounted on the vehicle instrument panel. The other side of lamp PL is connected by conductor 31 to a junction point 30, in conductor 21 between switch BS and junction point 22.

The arrangement operates in the following manner. Terminal 24 of ammeter 13 (shown for convenience as a junction point) is always at substantially the potential of battery terminal 12. When the ignition switch is closed, its armature 15 is at the potential of terminal 24.

Under these conditions, and if accelerator pedal AP is substantially or fully released, current will flow from terminal 24 through the ignition switch, conductor 26, switch AS, conductor 28, lamp PL, conductor 31, point 30, conductor 21, point 22, conductors 23, and lamps SL to ground. Lamp PL is lit, but its high resistance prevents sufficient current flow through lamps SL to effectively illuminate the latter.

If accelerator pedal AP is depressed to feed gas to the engine, lamp PL goes out until pedal AP is again released. If the vehicle brakes are now applied by depressing brake pedal BP, switch BS is closed. This places terminal 24 and point 30 at substantially the same potential, thus shunting lamp PL. Current now flows from terminal 24 through conductor 17, switch BS, conductor 21, point 22, conductors 23, and lamps SL to ground. This current flow is sufficient to illuminate lamps SL.

Should the stop lamp circuit be broken beyond point 30, lamp PL will fail to light. Also, should the stop lamp circuit be grounded between point 30 and terminal 24, lamp PL will be lit when the brakes are applied. Thus, lamp PL is an effective stop lamp circuit condition indicator, and is lit only when a brake application is imminent.

While a specific embodiment of the invention has been shown and described in detail to illustrate the application of the invention principle, it will be apparent that the

What is claimed is:

1. In a motor vehicle having a grounded source of electrical energy, a grounded ignition system, an ignition switch connected between said system and the ungrounded side of said source, grounded low resistance stop lamp means, and a brake pedal operated switch operable to connect the ungrounded side of said stop lamp means to the ungrounded side of said source, the combination comprising high resistance indicator lamp means connected to the ungrounded side of said stop lamp means; a normally closed switch connected in series between said indicator lamp means and said ignition switch; and a vehicle motion control operatively associated with said normally closed switch, said control opening said normally closed switch when operated to provide vehicle movement and closing the same when released; whereby said indicator lamp means will be lit when said ignition switch is closed and said control is released, and extinguished when either said control or said brake pedal operated switch is operated.

2. In a motor vehicle having a grounded source of electrical energy, a grounded ignition system, an ignition switch connected between said system and the ungrounded side of said source, an accelerator pedal, grounded low resistance stop lamp means, and a brake pedal operated switch operable to connect the ungrounded side of said stop lamp means to the ungrounded side of said source, the combination comprising a high resistance indicator lamp means and a control switch connected, in series with each other, between the ungrounded side of said stop lamp means and said ignition switch, and in shunt with said brake pedal operated switch, said control switch being connected to said accelerator pedal for opening, when said accelerator pedal is depressed, and closing when the latter is substantially released; whereby said indicator lamp means will be lit when said ignition switch is closed and said accelerator pedal is released, and extinguished when either said accelerator pedal is depressed or said brake pedal operated switch is operated.

3. In a motor vehicle having a grounded source of electrical energy, an eccelerator pedal, a grounded ignition system, an ammeter connected to the ungrounded side of said source, an ignition switch connected between said system and said ammeter, grounded low resistance stop lamp means, and a brake pedal operated switch operable to connect the ungrounded side of said stop lamp means to said ammeter, the combination comprising a high resistance indicator lamp means and a control switch connected, in series with each other, between the ungrounded side of said stop lamp means and said ammeter, and in shunt with said brake pedal operated switch, said control switch being connected to said accelerator pedal for opening, when said accelerator pedal is depressed, and closing when the latter is substantially released; whereby said indicator lamp means will be lit when said ignition switch is closed and said accelerator pedal is released, and extinguished when either said accelerator pedal is depressed or said brake pedal operated switch is operated.

References Cited in the file of this patent

UNITED STATES PATENTS

| | | |
|---|---|---|
| 1,535,263 | Smetzer | Apr. 28, 1925 |
| 1,782,334 | Aurand | Nov. 18, 1930 |
| 1,870,682 | Heising | Aug. 9, 1932 |
| 2,486,599 | Hollins | Nov. 1, 1949 |